(12) United States Patent
Han et al.

(10) Patent No.: US 11,970,407 B2
(45) Date of Patent: Apr. 30, 2024

(54) ION-EXCHANGE RESIN MODULE AND DEIONIZATION APPARATUS USING SAME

(71) Applicant: HYOSUNG HEAVY INDUSTRIES CORPORATION, Seoul (KR)

(72) Inventors: Chang Woo Han, Goyang-si (KR); Seung Boong Jeong, Seoul (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 444 days.

(21) Appl. No.: 17/299,207

(22) PCT Filed: Nov. 19, 2019

(86) PCT No.: PCT/KR2019/015818
§ 371 (c)(1),
(2) Date: Jun. 2, 2021

(87) PCT Pub. No.: WO2020/116823
PCT Pub. Date: Jun. 11, 2020

(65) Prior Publication Data
US 2022/0089466 A1 Mar. 24, 2022

(30) Foreign Application Priority Data
Dec. 6, 2018 (KR) .................. 10-2018-0155928

(51) Int. Cl.
*B01D 35/30* (2006.01)
*B01J 47/02* (2017.01)
(Continued)

(52) U.S. Cl.
CPC .............. *C02F 1/42* (2013.01); *B01D 35/30* (2013.01); *B01J 47/022* (2013.01); *C02F 2201/002* (2013.01)

(58) Field of Classification Search
CPC ...... C02F 1/42; C02F 2201/002; B01J 47/022; B01J 47/024; B01D 35/30; B01D 35/301;
(Continued)

(56) References Cited

U.S. PATENT DOCUMENTS 4,277,332 A * 7/1981 Baughn .................. B01J 47/022
210/136
4,659,466 A * 4/1987 Farr ....................... B01D 35/30
210/541

(Continued)

FOREIGN PATENT DOCUMENTS

CN 201949696 U 8/2011
EP 438738 B1 * 6/1995 ............... C02F 1/42
(Continued)

OTHER PUBLICATIONS

English translation of Bilz document EP438738B1, published Jun. 1995. (Year: 1995).*

*Primary Examiner* — Joseph W Drodge
(74) *Attorney, Agent, or Firm* — NKL Law; Jae Youn Kim (57) ABSTRACT

An ion-exchange resin module and a deionization apparatus using same are proposed. An ion-exchange resin module may have the inside filled with ion-exchange resin and may be configured to have a pressing plate such that fluid in the ion-exchange resin is discharged. Multiple ion-exchange resin modules may be installed by being stacked in an inner space defined inside a tank of the deionization apparatus. A discharge pipe which passes through the lower end of the tank and extends to the upper end thereof may be installed in the inner space, the discharge pipe being located in a through duct which passes through the centers of the ion-exchange resin modules.

10 Claims, 5 Drawing Sheets

(51) Int. Cl.
*B01J 47/022* (2017.01)
*C02F 1/42* (2023.01)

(58) Field of Classification Search
CPC .............. B01D 35/303; B01D 2201/30; B01D 2201/301; B01D 2201/302; B01D 2201/303
See application file for complete search history.

(56) References Cited

U.S. PATENT DOCUMENTS

| | | | | |
|---|---|---|---|---|
| 6,120,686 A | * | 9/2000 | Bilz | ........................ B01J 47/026 210/275 |
| 2011/0215043 A1 | * | 9/2011 | Trottier | .................. B01D 29/31 210/446 |

FOREIGN PATENT DOCUMENTS

| | | |
|---|---|---|
| JP | 08-164386 A | 6/1996 |
| JP | 2010-513003 A | 4/2010 |
| JP | 2014-131781 A | 7/2014 |
| KR | 10-2004-0074185 A | 8/2004 |
| KR | 20-0398981 Y1 | 10/2005 |
| KR | 10-2007-0042669 A | 4/2007 |
| KR | 10-2007-0098303 A | 10/2007 |
| KR | 20-0437273 Y1 | 11/2007 |
| WO | 2010-148658 A1 | 12/2010 |

\* cited by examiner

ION-EXCHANGE RESIN MODULE AND DEIONIZATION APPARATUS USING SAME

TECHNICAL FIELD

The present disclosure relates generally to an ion-exchange resin module and a deionization apparatus using the same. More particularly, the present disclosure relates to an ion-exchange resin module and a deionization apparatus using the same in which ions contained in water may be removed by using ion-exchange resin.

BACKGROUND ART

Ion-exchange resin is used to make pure water used in industrial sites or to remove ions from water used as a coolant. Water to be deionized is transmitted to the inside of a tank containing the ion-exchange resin, and as the water passes through the ion-exchange resin, cations or anions contained in the water are removed, resulting in pure water or water suitable for the coolant.

Figure 1:
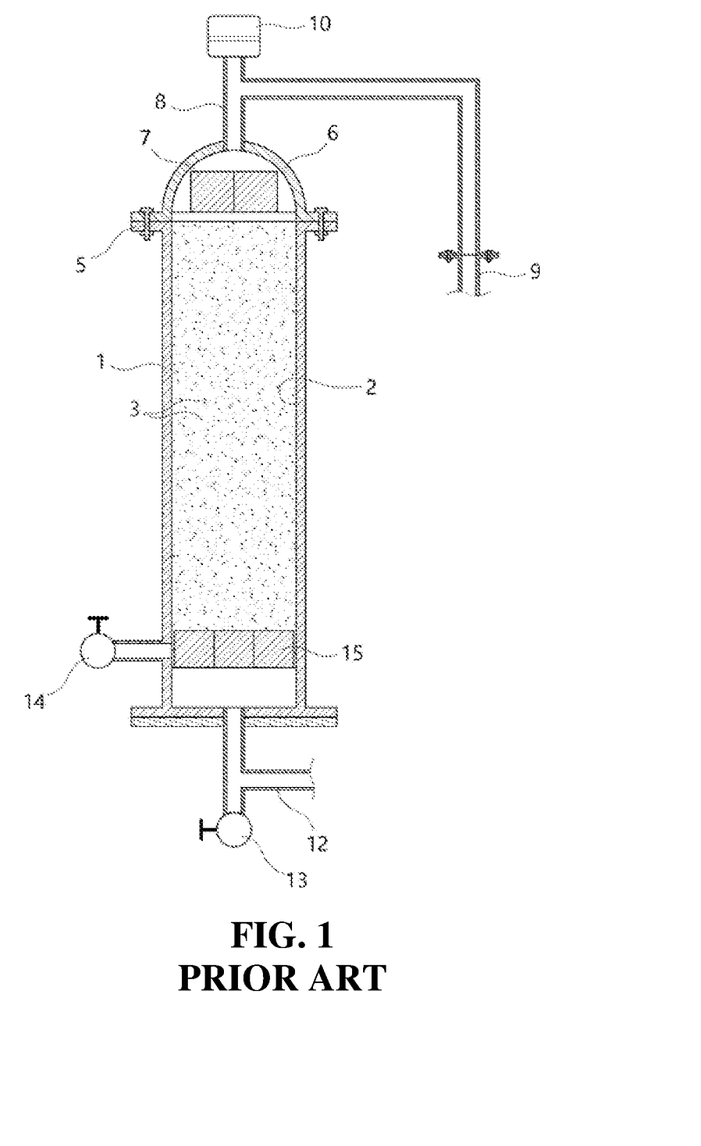
FIG. 1 is a sectional view illustrating the configuration of a deionization apparatus according to a conventional technology.

A deionization apparatus according to a conventional technology is illustrated in FIG. 1. As illustrated in the drawing, an inner space 2 is defined in the tank 1 having a predetermined shape. The ion-exchange resin 3 is filled in the inner space 2, and while water transmitted to an upper portion of the tank is moved downward by gravity or the pressure of the pump, the water is deionized. An upper end flange 5 is provided by surrounding the upper end of the tank 1, and a cap 6 is fastened to the upper end flange 5. The inner space 2 is shielded from the outside by the cap 6. When the cap 6 is removed from the tank, the inner space 2 communicates with the outside.

One or multiple strainers 7 are installed in the cap 6 so as to filter foreign matter contained in water introduced into the inner space 2. An introduction pipe 8 is connected to the cap 6 such that water is transmitted to the inner space 2. Water is supplied to the introduction pipe 8 through a connecting pipe 9. For example, the connecting pipe 9 is connected to a cooling system or is connected to a water supply source. An air vent 10 is installed at the upper end of the introduction pipe 8 such that air inside the introduction pipe 8 is discharged to the outside. A discharge pipe 12 is provided at the lower portion of the tank 1. Water deionized while passing through the inner space 2 is transmitted to the cooling system through the discharge pipe 12.

Meanwhile, a drain valve 13 is provided in the tank 1 such that during the replacement of the ion-exchange resin 3, water in the inner space 2 is drained. Furthermore, a resin discharge valve 14 is provided to discharge the ion-exchange resin 3 of the inner space 2.

However, the deionization apparatus according to the conventional technology described above has the following issues.

The ion-exchange resin 3 is consumable and thus are required to be replaced periodically. However, ion-exchange resin located at the lower portion of the inner space 2 is ion-exchanged less than ion-exchange resin located at the upper portion of the inner space 2, and thus may be reused. However, in the conventional technology, the entirety of the ion-exchange resin 3 is required to be replaced.

To replace the ion-exchange resin 3, some of water in the inner space 2 is drained through the drain valve 13, and after the ion-exchange resin 3 is discharged through the resin discharge valve 14 by opening the cap 6, the inner space 2 is required to be filled with new ion-exchange resin 3.

In this process, water (for example, water containing glycol) in the ion-exchange resin 3 is not completely drained out and is discharged together with the ion-exchange resin 3, so the ion-exchange resin 3 is not reused.

In addition, to remove the cap 6 from the tank 1, the introduction pipe 8 is also required to be disconnected from the connecting pipe 9, which causes the removing of the cap to be complicated. Furthermore, after the replacement of the ion-exchange resin 3, it is necessary that the introduction pipe 8 and the connecting pipe 9 are connected to each other and the cap 6 is mounted to the upper end flange 5 of the tank 1. Such a process takes a relatively long time and, particularly, requires a water pressure test in the inner space, so it takes a lot of time to replace the ion-exchange resin 3. Accordingly, there is a problem that it is difficult to operate the cooling system during the replacement of the ion-exchange resin 3.

The introduction pipe 8 passes through a portion higher than the tank 1 and space at a side thereof in a lateral direction, so there is also a problem that space for installing the deionization apparatus is relatively increased.

DISCLOSURE

Technical Problem

The present disclosure has been made keeping in mind the above problems occurring in the prior art, and the present disclosure is intended to propose an ion-exchange resin module used in a deionization apparatus such that the replacement of ion-exchange resin is simplified.

In addition, the present disclosure is intended to propose an ion-exchange resin module used in the deionization apparatus.

Furthermore, the present disclosure is intended to minimize the size of the deionization apparatus.

Additionally, the present disclosure is intended to maximize the recycling of components related to ion-exchange resin.

Technical Solution

In order to accomplish the above objectives, according to an aspect of the present disclosure, an ion-exchange resin module of the present disclosure includes: a first casing having a first through hole formed therein such that fluid passes through the first through hole; a second casing coupled to the first casing such that a module space is defined in the first casing and the second casing coupled to each other, the second casing having a second through hole formed therein such that fluid passes through the second through hole; ion-exchange resin filled in the module space and performing deionization; a pressing plate located in the module space and on an inner surface of the second casing, the pressing plate configured to move in the module space so as to press the ion-exchange resin; and a handle having a portion exposed to an outside of the first casing such that a force allowing the pressing plate to be moved is supplied to the handle, the handle configured to move to the outside of the first casing and to move the pressing plate.

The ion-exchange resin module may further include: a through duct allowing a discharge pipe to be located therein, the discharge pipe passing through a center of each of the first casing, the second casing, the pressing plate, and the module space.

The handle may be connected rotatably to an end part of a connecting bar by a hinge shaft, the connecting bar being fixed to the pressing plate in the module space.

The handle may be rotated relative to the hinge shaft after being pulled outside of the first casing and may be held on an outer surface of the first casing such that the pressing plate presses the ion-exchange resin.

The handle may include at least two handles installed at predetermined angular intervals.

The first through hole may have an inner diameter such that foreign matter mixed in the fluid, the ion-exchange resin, and crushed matter of the ion-exchange resin do not pass through the first through hole, wherein the inner diameter of the first through hole may have the same size as a size of an inner diameter of the second through hole.

A plate through hole may be formed even in the pressing plate, the plate through hole having the same size as the size of the first through hole.

According to another aspect of the present disclosure, a deionization apparatus including the ion-exchange resin module of the present disclosure includes: a tank having an inner space defined therein and allowing a cap to be mounted to an upper end of the tank, the cap configured to open and close the inner space; an introduction pipe configured to communicate with the inner space at a lower end of the tank such that fluid is transmitted to the inner space; the discharge pipe configured to communicate with the inner space at a lower end of the tank such that the fluid is discharged; and the ion-exchange resin module installed in the inner space and allowing the discharge pipe to pass through a center of the ion-exchange resin module.

The ion-exchange resin module may include multiple ion-exchange resin modules stacked in the inner space such that the discharge pipe is located in the through duct of each of the ion-exchange resin modules.

A cross-sectional appearance of the ion-exchange resin module may have the same shape as a cross section of the inner space of the tank.

Each of the ion-exchange resin module and the inner space may have a cylindrical shape.

Advantageous Effects

The deionization apparatus of the present disclosure may obtain the following effects.

First, in the present disclosure, the introduction pipe may be introduced to the tank from the lower end thereof such that water is supplied to the inner space from the lower end of the inner space of the tank. Accordingly, space for the installation of the introduction pipe at the surrounding area of the tank may be minimized, thereby miniaturizing the deionization apparatus.

In addition, in the present disclosure, the introduction pipe and the discharge pipe may be connected to the inner space at the lower end of the tank, so although the cap of the tank is removed for the replacement of the ion-exchange resin, the introduction pipe and the discharge pipe may be left untouched, thereby minimizing maintenance work time.

In the present disclosure, the ion-exchange resin modules in which the ion-exchange resin is located in the module space defined by the first casing and the second casing may be installed in the inner space of the tank. The ion-exchange resin modules may have the ion-exchange resin by dividing the ion-exchange resin filling the entirety of the tank, so ion-exchange resin which is ion-exchanged much and ion-exchange resin which is not ion-exchanged much may be separated from each other such that the ion-exchange resin which is not ion-exchanged much may be recycled, thereby using the ion-exchange resin more efficiently.

In addition, the pressing plate may be provided in the ion-exchange resin module and in the process of moving the module upward, the ion-exchange resin located in the module may be pressed so as to discharge water present in the ion-exchange resin. Accordingly, a coolant may not be discharged to the outside, thereby minimizing the replenishment of the coolant.

Furthermore, in the present disclosure, bubbles produced while the coolant passes through the ion-exchange resin modules in the tank may be collected in the upper portion of the cap of the tank, thereby enabling removal of the bubbles through an air vent.

BEST MODE

Hereinafter, an exemplary embodiment of the present disclosure will be described in detail through exemplary drawings. In adding reference numerals to components of each drawing, it should be noted that the same components have the same numerals when possible even if they are indicated on different drawings. In addition, in describing the embodiment of the present disclosure, when it is determined that a detailed description of a related known configuration or function interferes with the understanding of the embodiment of the present disclosure, the detailed description thereof will be omitted.

In addition, in describing the components according to the embodiment of the present disclosure, terms such as first, second, A, B, (a), and (b) may be used. These terms are only for distinguishing the components from other components, and the nature, order, or order of the components is not limited by the terms. When a component is described as being "connected" or "coupled" to another component, the component may be directly connected or coupled to the another component. However, it should be understood that still another component may be "connected" or "coupled" to each component therebetween. In this specification, for convenience, a sub-module cooling device of a power transmission system according to the present disclosure is applied to the sub-modules of an HVDC system as an example.

Figure 2:
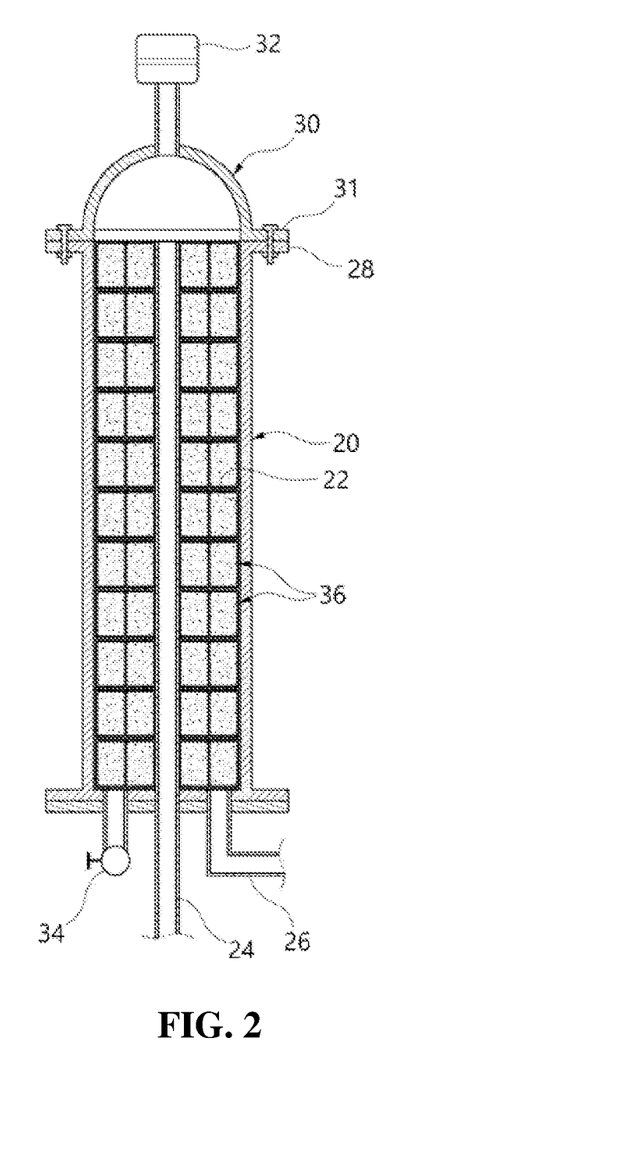
FIG. 2 is a sectional view illustrating the configuration of a deionization apparatus according to an exemplary embodiment of the present disclosure.

In the drawings, a deionization apparatus of the present disclosure and an ion-exchange resin module used therein are illustrated. First, a tank 20 may constitute the exterior of the deionization apparatus. The tank 20 may be formed by extending long in the direction of gravity. The tank 20 may have a cylindrical shape erected perpendicularly to the ground. An inner space 22 may be defined in the tank 20. Ion exchange may take place in the inner space 22.

A discharge pipe 24 passing through the lower end of the tank 20 may be installed in the tank. The discharge pipe 24 may communicate with the inner space 22 by passing through the lower end of the tank 20. The discharge pipe 24 may extend perpendicularly to the ground in a direction opposite to the ground. Water coming out through the discharge pipe 24 may be transmitted to a storage tank or may be transmitted to a cooling system such that the water functions as a coolant as an example. The upper end of the discharge pipe 24 may be located at a position near the top of the inner space 22.

An introduction pipe 26 may be connected to the lower end of the tank 20. In the embodiment, the introduction pipe 26 may communicate with the inner space 22 by passing through the lower surface of the tank 20. Water may be supplied to the inner space 22 of the tank 20 through the introduction pipe 26.

An upper end flange 28 may be provided by surrounding the upper end edge of the tank 20, and a cap 30 may be mounted to the upper end flange 28. A cap flange 31 having shape and size corresponding to the upper end flange 28 may be provided by surrounding the edge of the cap 30. The cap flange 31 may be seated on and coupled to the upper end flange 28. Accordingly, the cap 30 may shield the inner space 22 from the outside. An air vent 32 may be installed at the cap 30, the air vent 32 configured to discharge air in the inner space 22 to the outside.

A drain valve 34 may be provided at the lower end of the tank 20. The drain valve 34 is intended to discharge a predetermined amount of water present in the inner space 22 during the replacement of ion-exchange resin 42. In the embodiment, the drain valve 34 may be installed by passing through the lower surface of the tank 20, but may be installed at the discharge pipe 24.

To deionize water supplied through the introduction pipe 26, the ion-exchange resin module 36 in which the ion-exchange resin 42 is filled may be installed in the tank 20. The ion-exchange resin module 36 may be configured to have a diameter slightly smaller than the inner diameter of the inner space 22 of the tank 20. A predetermined amount of the ion-exchange resin 42 may be filled in the ion-exchange resin module 36. The ion-exchange resin module 36 may be held at a predetermined position in the tank 20. To this end, a structure configured to hold the ion-exchange resin module 36 may be provided in the tank 20.

Figure 3:
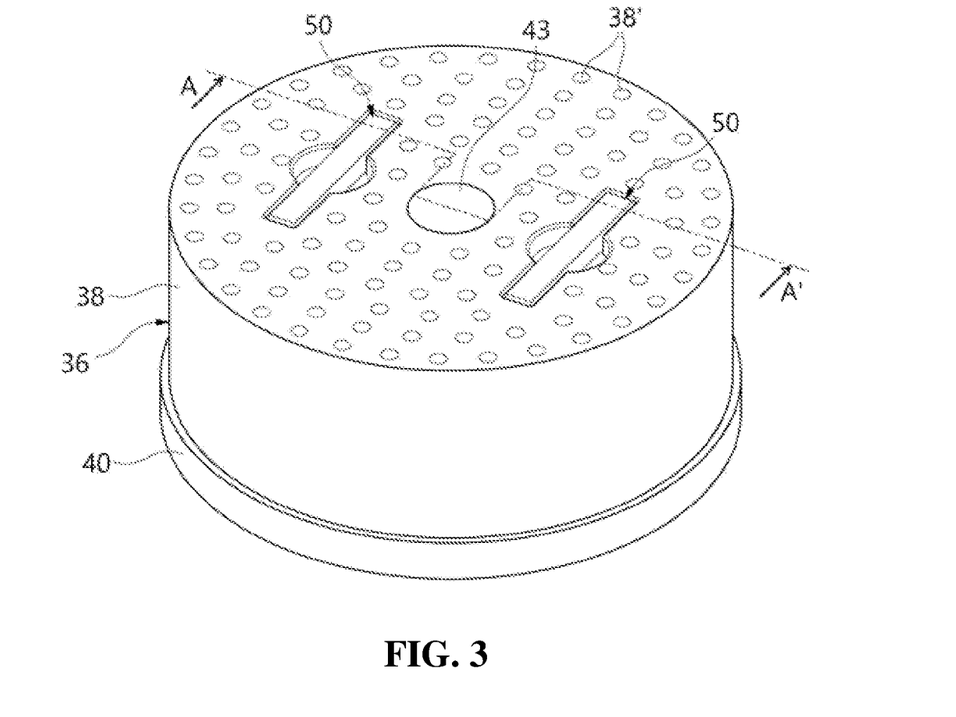
FIG. 3 is a perspective view illustrating an ion-exchange resin module in which ion-exchange resin is filled and used in the deionization apparatus of the present disclosure.
Figure 4:
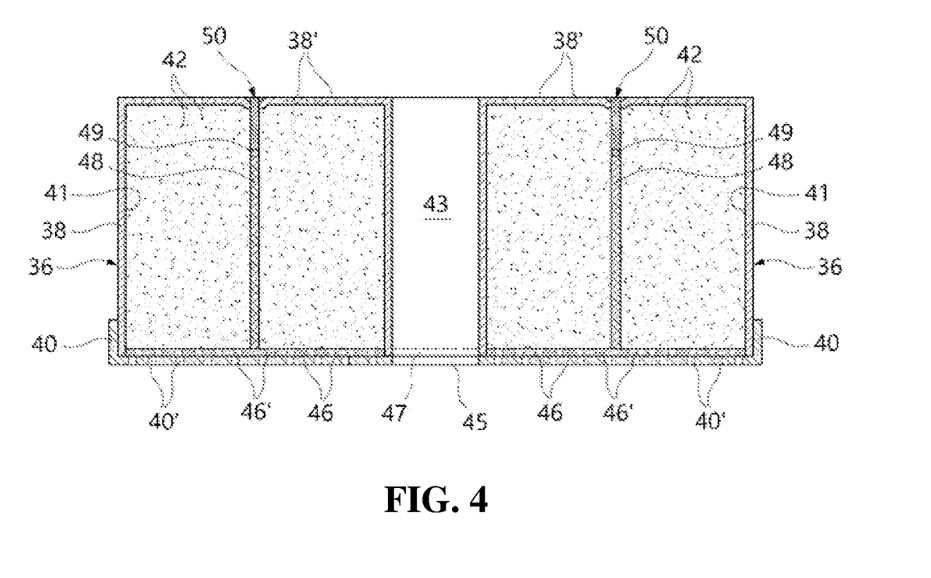
FIG. 4 is a sectional view taken along line A-A' of FIG. 3.

A first casing 38 and a second casing 40 may constitute the exterior of the ion-exchange resin module 36. The first casing 38 and the second casing 40 may be coupled to each other. In the embodiment, the first casing 38 and the second casing 40 may be coupled to each other to have a cylindrical shape. To couple the first casing 38 to the second casing 40, a thread part may be formed on an outer surface of the lower end part of the first casing 38 in a circumferential direction thereof and a thread part engaged with the thread part of the first casing may be formed even on an inner surface of the second casing 40 in a circumferential direction thereof. Accordingly, the second casing 40 may be rotated relative to the first casing 38 to be screwed thereto and thus a module space 41 may be defined in the first casing 38. The exterior of the ion-exchange resin module 36 constituted by the first casing 38 and the second casing 40 may be configured to correspond to the inner space 22 of the tank 20. In the embodiment, the exteriors of the ion-exchange resin module 36 and the tank 20 may all have cylindrical shapes. However, the tank 20 and the ion-exchange resin module 36 may have polyhedral shapes corresponding to each other such as hexahedral shapes.

First through holes 38' may be formed in the first casing 38. The first through holes 38' may be formed in the entirety of the first casing 38. However, in the embodiment, multiple first through holes 38' may be formed in a top plate of the first casing 38 relative to the drawing. Each of the first through holes 38' may be configured to have a diameter smaller than a diameter of the ion-exchange resin 42 such that the ion-exchange resin 42 does not escape to the outside. This is because when the ion-exchange resin 42 escapes to the outside of the ion-exchange resin module 36, the ion-exchange resin 42 may be introduced to the cooling system as an example. The first through hole 38' may be required to have an inner diameter such that the ion-exchange resin 42, foreign matter mixed in the coolant, and a crushed matter of the ion-exchange resin 42 may not pass through the first through hole 38'.

Second through holes 40' may be formed even in a lower plate of the second casing 40 facing a portion in which the first through hole 38' is formed. It may be recommended that each of the second through holes 40' is configured to have the same diameter as the diameter of the first through hole 38'. This is to prevent the ion-exchange resin 42 from being lost through the second through hole 40' while during maintenance, the ion-exchange resin module 36 is removed from the tank 20 to the outside. Accordingly, the diameter of the first through hole 38' may be a size to filter the ion-exchange resin 42, the crushed matter, and foreign matter, and may be the same as the diameter of the second through hole 40'.

A through duct 43 may be provided by passing through the first casing 38, the second casing 40, and the module space 41. The discharge pipe 24 may be located in the through duct 43. A bottom through part 45 may be formed in the second casing 40 such that the bottom through part 45 communicates with the through duct 43. Of course, the through duct 43 may be located up to the bottom through part 45.

Figure 5:
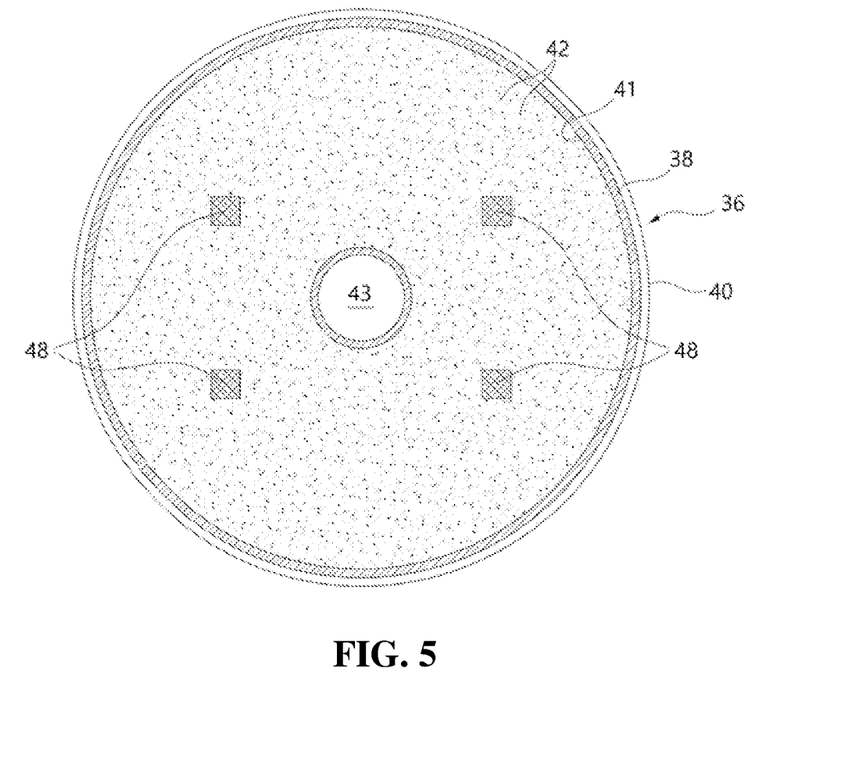
FIG. 5 is a cross-sectional view illustrating the inner configuration of the ion-exchange resin module illustrated in FIG. 3.

A pressing plate 46 may be provided in the module space 41. The pressing plate 46 may be a donut-shaped plate and may usually be seated on an inner surface of the second casing 40. A plate through hole 46' may be formed even in the pressing plate 46 such that the ion-exchange resin 42 does not pass through the plate through hole and water passes therethrough. The plate through hole 46' may include multiple plate through holes distributed evenly like the first through hole 38' and the second through hole 40'. A center through hole 47 may be formed in the center of the pressing plate 46 such that the center through hole corresponds to the through duct 43 and the bottom through part 45. The plate through hole 46' may have the same diameter as the diameter of each of the first through hole 38' and the second through hole 40'.

A connecting bar 48 may be fixed orthogonally to a surface of the pressing plate 46. In the embodiment, four connecting bars 48 are used, but the number and locations of the connecting bars 48 may vary. A handle 50 may be installed rotatably at the connecting bar 48. The handle 50 may be connected to each of two connecting bars 48 such that the handle 50 is rotatable relative to a hinge shaft 49. As illustrated in FIG. 3, A portion of the handle 50 in which a tool is held or a portion of the handle 50 which an operator grips may be exposed to the outer surface of the first casing 38. Each of orthogonal portions of opposite ends of the handle 50 may be connected to the connecting bar 48 by the hinge shaft 49 in the module space 41.

Accordingly, when the handle 50 is pulled, the pressing plate 46 may be moved upward, and the position of the hinge shaft 49 may be moved to the outside of the first casing 38, so the handle 50 may be rotated. The handle 50 may be rotated and may be held on the outer surface of the first casing 38. To this end, a structure for holding the handle 50 on the outer surface of the first casing 38 may be provided.

Hereinafter, the operations of the ion-exchange resin module having the configuration described above and the deionization apparatus using the same will be described in detail.

In the deionization apparatus of the present disclosure, multiple ion-exchange resin modules 36 may be stacked one after the other in the inner space 22 of the tank 20, and when water is introduced to the inner space 22 through the introduction pipe 26 located at the lower end of the inner space 22, ions contained in the water may be removed as the water passes consecutively through the ion-exchange resin modules 36. Accordingly, when the water filled in the inner space 22 moves to the upper end of the inner space 22, the deionized water may move to the discharge pipe 24, and the deionized water may be discharged through the discharge pipe 24.

The passing of water through the ion-exchange resin module 36 is described below.

Water may pass through the second through hole 40' of the second casing 40 and the plate through hole 46' of the pressing plate 46 and may be introduced into the module space 41. In this process, foreign matter may not pass through the second through hole 40' and the plate through hole 46' of the pressing plate 46, but only water may pass therethrough. The water introduced into the module space 41 may be deionized by the ion-exchange resin 42. Water passing through the ion-exchange resin 42 may exit the ion-exchange resin module 36 through the first through hole 38' of the first casing 38.

In this manner, when water passes consecutively through the multiple ion-exchange resin modules 36 and moves to the top of the inner space 22, the water may be discharged to the outside of the tank 20 through the discharge pipe 24, and may be transmitted to the cooling system as an example.

Meanwhile, the ion-exchange resin modules 36 may be used in the tank 20 and may be required to be replaced after a predetermined period. To this end, first, the drain valve 34 may be opened and only a predetermined amount of water contained in the inner space 22 may be discharged and the discharged water may be collected to be recycled. In this case, the discharge pipe 24 and the introduction pipe 26 may be closed.

In addition, the cap 30 may be removed from the tank 20 to open the inner space 22. In the process of the removal of the cap 30, no additional work may be required since only the air vent 32 is connected to the cap 30. When the inner space 22 is opened by the removal of the cap 30, the ion-exchange resin modules 36 may be taken out of the inner space 22 one by one.

In this process, when an operator's hand reaches the handle 50, the operator may hold the handle 50 and pull the ion-exchange resin module 36 out of the inner space 22. However, the ion-exchange resin module 36 may be pulled out of the inner space by holding a separate tool on the handle 50.

Figure 6:
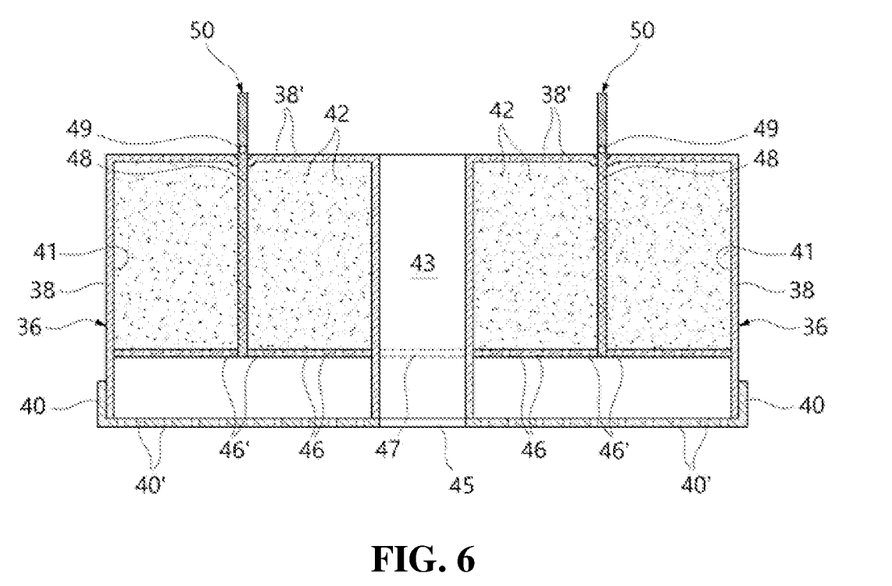
FIG. 6 is a view illustrating the state of the ion-exchange resin module in the process of upward moving the ion-exchange resin module illustrated in FIG. 3 in an inner space of the tank.

In a process in which the handle 50 is pulled to the outside of the first casing 38, the connecting bar 48 connected to the handle 50 may pull the pressing plate 46. Due to this motion, the pressing plate 46 may be moved slightly upwards in the module space 41. In the process of holding and upwards pulling the handle 50, the first casing 38 and the second casing 40 may be maintained intact, and the ion-exchange resin 42 is compressed due to the upward motion of the pressing plate 46, which is illustrated in FIG. 6. Of course, when the handle 50 is pulled while the first casing 38 is pushed, the compression of the ion-exchange resin may securely be performed.

When the pressing plate 46 presses the ion-exchange resin 42, water in the ion-exchange resin 42 may be drained to the outside of the ion-exchange resin module 36 through the plate through hole 46' of the pressing plate 46 and the second through hole 40' of the second casing 40. This may be performed in the process of moving the ion-exchange resin module 36 upward in the inner space 22. In this case, for example, a material (glycol) required for the water to be used as a coolant may be recycled.

The ion-exchange resin module 36 located at a relatively upper portion of the tank may have a higher deionization capacity than the ion-exchange resin module 36 located at a lower portion of the tank. This is because when a deionization occurs in the tank 20, the deionization mostly occurs in the ion-exchange resin module 36 located at the lower portion of the tank. Accordingly, some of the ion-exchange resin modules 36 located at the upper portion of the tank 20 may be recycled.

Figure 7:
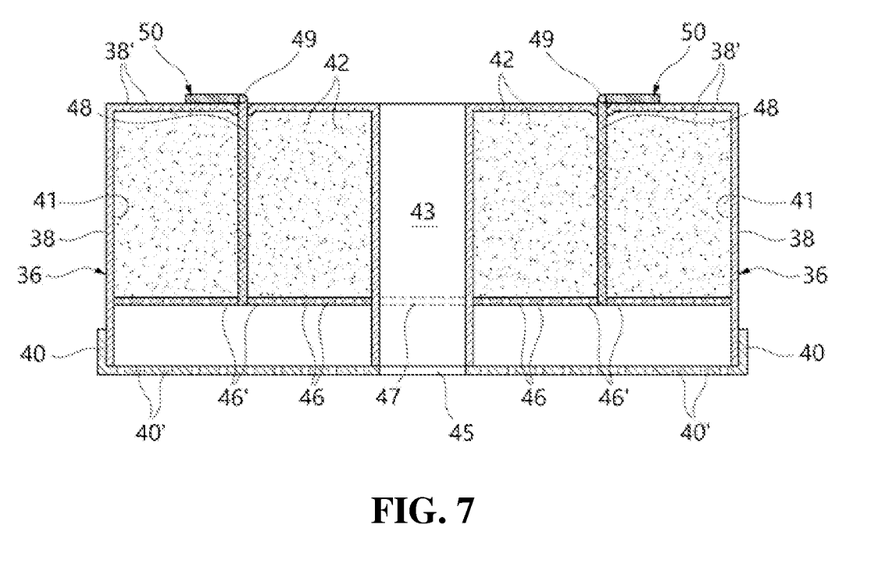
FIG. 7 is a sectional view illustrating a state in which a handle is in close contact with an outer surface of a first casing by rotating the handle in the ion-exchange resin module illustrated in FIG. 3.

Meanwhile, as illustrated in FIG. 7, the forcible discharging of water in the ion-exchange resin 42 by using the pressing plate 46 may be performed by bringing the handle 50 into close contact with the outer surface of the first casing 38 such that the handle 50 is held thereon. This is because the ion-exchange resin module is set such that the ion-exchange resin 42 filled in the module space 41 is pressed as much as possible.

When a new ion-exchange resin module 36 is introduced into the inner space 22, the cap 30 may be fastened to the upper end of the tank 20. That is, when the cap 30 is fastened to the upper end flange 28 and the introduction pipe 26 and the discharge pipe 24 are opened, the deionization apparatus may operate again.

In the above, just because all the components constituting the embodiment of the present disclosure are described as being combined integrally with each other or operating in combination, the present disclosure is not necessarily limited to this embodiment. That is, within the scope of the present disclosure, at least two of all of the components may be selectively combined with each other to be operated. In addition, the terms such as "include", "consist of", or "have" described above mean that corresponding components may be present unless otherwise stated, so the terms should be construed that other components may not be excluded, but further be included. All terms, including technical or scientific terms, have the same meaning as commonly understood by a person of ordinary skill in the technical field to which the present disclosure belongs, unless otherwise defined. Generally used terms, such as terms defined in a dictionary, should be interpreted as being consistent with the contextual meaning of the related technology, and should not be interpreted in an ideal meaning or an excessively formal meaning unless explicitly defined in the present disclosure.

The above description is merely illustrative of the technical idea of the present disclosure, and a person with ordinary knowledge in the technical field to which the present disclosure belongs may variously modify the embodiment within the scope of the present disclosure without departing from the essential characteristics of the present disclosure. Accordingly, the embodiment disclosed in the present disclosure is not intended to limit, but to explain the technical idea of the present disclosure, and the scope of the technical idea of the present disclosure is not limited to this embodiment. The scope of protection of the present disclosure should be interpreted by the scope of the claims below, and all technical ideas within the scope equivalent thereto should be construed as being included in the scope of the claims of the present disclosure.

In the above description according to the embodiment, it is described that ions may be removed from water, but ions may also be removed from various fluids to which the deionization apparatus of the present disclosure may be applied.

The exterior of the ion-exchange resin module of the present disclosure may be constituted by the first casing 38 and the second casing 40 coupled to each other, and the shapes and combination of the first casing 38 and the second casing 40 may be variously made.

In the illustrated embodiment, the handle 50 may include two handles installed symmetrically to each other relative to the through duct 43. However, the handle 50 may include at least two handles 50 used according to the weight of the ion-exchange resin 42 filled in the module space 41. It may be recommended that the handles are installed at predetermined angular intervals.

The invention claimed is:

1. An ion-exchange resin module comprising:
a first casing having a first through hole formed therein such that fluid passes through the first through hole;
a second casing coupled to the first casing such that a module space is defined in the first casing and the second casing coupled to each other, the second casing having a second through hole formed therein such that fluid passes through the second through hole;
ion-exchange resin filled in the module space and performing deionization;
a pressing plate located in the module space and on an inner surface of the second casing, the pressing plate configured to move in the module space so as to press the ion-exchange resin;
at least one handle having a portion exposed to an outside of the first casing such that a force allowing the pressing plate to be moved is supplied to the at least one handle, the handle configured to move to the outside of the first casing and to move the pressing plate; and
a through duct having a discharge pipe located therein, the discharge pipe passing through a center of each of the first casing, the second casing, the pressing plate, and the module space.

2. The ion-exchange resin module of claim 1, wherein the handle is connected rotatably to an end part of a connecting bar by a hinge shaft, the connecting bar being fixed to the pressing plate in the module space.

3. The ion-exchange resin module of claim 2, wherein the handle is rotatable around a hinge axis of the hinge shaft while being pulled out of the first casing, and the handle is fixed to an outer surface of the first casing so that the pressing plate presses the ion-exchange resin.

4. The ion-exchange resin module of claim 3, wherein the at least one handle comprises at least two handles installed at predetermined angular intervals.

5. The ion-exchange resin module of claim 4, wherein the first through hole has an inner diameter such that foreign matter mixed in the fluid, the ion-exchange resin, and crushed matter of the ion-exchange resin do not pass through the first through hole, wherein the inner diameter of the first through hole has the same size as a size of an inner diameter of the second through hole.

6. The ion-exchange resin module of claim 5, wherein a plate through hole is formed even in the pressing plate, the plate through hole having the same size as the size of the first through hole.

7. A deionization apparatus comprising the ion-exchange resin module of claim 1, the deionization apparatus comprising:
a tank having an inner space defined therein and having a cap mounted to an upper end of the tank, the cap configured to open and close the inner space; and
an introduction pipe configured to communicate with the inner space at a lower end of the tank such that fluid is transmitted to the inner space;
the discharge pipe configured to communicate with the inner space at the lower end of the tank such that the fluid is discharged; and
the ion-exchange resin module installed in the inner space and allowing the discharge pipe to pass through a center of the ion-exchange resin module.

8. The deionization apparatus of claim 7, wherein the deionization apparatus comprises at least one additional ion-exchange resin module as defined in claim 1, and all of the modules are stacked in the inner space such that the discharge pipe of each of the modules forms a common discharge pipe located in the through duct of each of the ion-exchange resin modules.

9. The deionization apparatus of claim 8, wherein a cross-sectional appearance of each of the ion-exchange resin modules have the same shape as a cross section of the inner space of the tank.

10. The deionization apparatus of claim 9, wherein each of the multiple ion-exchange resin module modules and the inner space have a cylindrical shape.

* * * * *